(12) United States Patent
Poston

(10) Patent No.: US 8,233,897 B2
(45) Date of Patent: Jul. 31, 2012

(54) ASSESSMENT OF IDLE PORTIONS OF MULTIDIMENSIONAL RADIO SPECTRUM ACCESS

(75) Inventor: Jeffrey D. Poston, Reston, VA (US)

(73) Assignee: The MITRE Corporation, McLean, VA (US)

( * ) Notice: Subject to any disclaimer, the term of this patent is extended or adjusted under 35 U.S.C. 154(b) by 828 days.

(21) Appl. No.: 11/453,038

(22) Filed: Jun. 15, 2006

(65) Prior Publication Data

US 2007/0293170 A1    Dec. 20, 2007

(51) Int. Cl.
*H04W 4/00* (2009.01)
(52) U.S. Cl. .................................. 455/422.1; 370/338
(58) Field of Classification Search ............... 455/562.1, 455/561, 422.1, 423, 424, 426.1, 456.1–456.6; 375/327; 370/328, 329, 338
See application file for complete search history.

(56) References Cited

U.S. PATENT DOCUMENTS

| | | | | |
|---|---|---|---|---|
| 6,697,644 | B2 * | 2/2004 | Scherzer et al. | 455/562.1 |
| 7,660,366 | B2 * | 2/2010 | Picco et al. | 375/327 |
| 2001/0003443 | A1 * | 6/2001 | Velazquez et al. | 342/367 |
| 2004/0266457 | A1 * | 12/2004 | Dupray | 455/456.5 |
| 2006/0121946 | A1 * | 6/2006 | Walton et al. | 455/561 |

OTHER PUBLICATIONS

Ashley, S., "Cognitive Radio," Scientific American, Mar. 2006, pp. 66-73.
"Comments on NPRM," Motorola, Nov. 2004, http://gullfoss2.fcc.gov/prod/ecfs/retrieve.cgi?native_or_pdf=pdf&id_document=6516883639.
"Comments on NPRM," Shared Spectrum, Inc., Nov. 2004, http://gullfoss2.fcc.gov/prod/ecfs/retrieve.cgi?native_or_pdf=pdf&id_document=6516883619.
"Comments on NPRM: Appendix A," Shared Spectrum, Inc., Nov. 2004, pp. 1-38, 46-76, http://gullfoss2.fcc.gov/prod/ecfs/retrieve.cgi?native_or_pdf=pdf&id_document=6516883623.
"Comments on NPRM: Appendix B" Shared Spectrum, Inc., Nov. 2004, http://gullfoss2.fcc.gov/prod/ecfs/retrieve.cgi?native_or_pdf=pdf&id_document=6516883627.
"Comments on NPRM: Appendix C" Shared Spectrum, Inc., Nov. 2004, http://gullfoss2.fcc.gov/prod/ecfs/retrieve.cgi?native_or_pdf=pdf&id_document=6516883622.
"MITRE Designs an Adaptive Spectrum Radio Platform," The Pentek Pipeline, vol. 12, No. 1, Spring 2003.
Poston, J. and Horne, W., "Discontiguous OFDM Considerations for Dynamic Spectrum Access in Idle TV Channels," IEEE DySPAN conference, Nov. 8-11, 2005.

* cited by examiner

*Primary Examiner* — Michael Faragalla
(74) *Attorney, Agent, or Firm* — Sterne, Kessler, Goldstein & Fox, P.L.L.C.

(57) ABSTRACT

Embodiments herein provide methods and systems for quantifying idle radio spectrum access across a geographic region. In an embodiment, a method for quantifying idle radio spectrum access across a geographic region includes selecting geo-referenced locations from within the geographic region to form a geo-referenced set of observation locations, independently integrating go-referenced coverage areas for one or more wireless devices within the geographic region to form an assessment of multidimensional radio spectrum conditions across the geographic region, and computing geo-referenced portions of idle multidimensional radio spectrum access across the geographic region. The method may additionally include expressing the geo-referenced portions of idle multidimensional radio spectrum access in terms of spatial statistics, aggregate statistics, and a combination of spatial statistics and aggregate statistics.

32 Claims, 10 Drawing Sheets

ASSESSMENT OF IDLE PORTIONS OF MULTIDIMENSIONAL RADIO SPECTRUM ACCESS

BACKGROUND OF THE INVENTION

1. Field of the Invention

The present invention relates generally to the field of wireless communications. More specifically, the present invention relates to quantifying idle radio spectrum access across a geographic region.

2. Background Art

IEEE 802.11-compatible wireless devices utilize unlicensed bands of radio spectrum. As such, these devices are popular because they relieve the user of the administrative burden associated with gaining a formal assignment of radio spectrum. However, as these unlicensed wireless devices proliferate, many regions have encountered significant congestion within the unlicensed bands of radio spectrum. This congestion stands in stark contrast with numerous long-term surveys of radio spectrum utilization, which indicate that many licensed bands of radio spectrum exhibit a very low level of utilization, even though fully assigned in a legal sense (see "Comments on NPRM," Shared Spectrum Inc., ET Docket No. 04-186, November 2004, incorporated herein by reference in its entirety). The present low level of utilization is partially a consequence of long-standing regulations that aim to prevent harmful interference among certain wireless services. Those long-standing regulations implicitly incorporate the limitations of decades-old technologies.

Conventional wireless technologies, such as conventional wireless devices operating within pre-planned or ad hoc wireless communication systems, access multidimensional radio spectrum through a set of specified radio spectrum access parameters. In the case of preplanned wireless systems, the radio spectrum access parameters are obtained from detailed radio enginnering planning tools and the detailed site surveys of existing radio spectrum access across a coverage area. However, the intrinsically unplanned nature of ad hoc wireless systems severely limits the applicability of the detailed radio engineering planning tools and detailed site surveys that are used to configure pre-planned wireless networks. Thus, the configuration of ad hoc wireless networks may not accurately reflect existing radio spectrum conditions across the coverage area.

Conventional wireless devices generally lack the ability to dynamically adjust their radio spectrum access in accordance with changes in existing radio spectrum conditions. However, recent proceedings of the Federal Communications Commission have demonstrated an interest in considering new methods for dynamic spectrum access, including the dynamic access of idle radio spectrum by devices with sufficient intelligence to modify their behavior in order to avoid harmful interference with licensed wireless systems. Thus, a need exists for wireless systems and methods that not only dynamically access the multidimensional radio spectrum, but that are capable of determining the idle portions of multidimensional radio spectrum access within a particular geographic region.

Prior measurement-based studies of radio spectrum occupancy typically sample an observed power spectral density at a few locations within a specified geographic region (see "Comments on NPRM," Shared Spectrum Inc., ET Docket No. 04-186, November 2004, incorporated herein by reference in its entirety). The applicability of these studies is, however, severely limited by the relatively small sampling of locations across the geographic region.

Additional studies of radio spectrum capacity have recognized the need for larger samples of geo-referenced locations. These studies generally combine larger samples of geo-referenced observation locations with engineering judgments about conventional wireless devices to draw conclusions about spectrum availability (see, for example, "Comments on NPRM," Motorola, ET Docket No. 04-186, November 2004, incorporated herein by reference in its entirety). Unfortunately, the coupling of the radio spectrum capacity analysis with device-specific technical details limits the relevance of these studies. As such, it is difficult to apply the results from these studies to the problem of assessing the value of emerging wireless devices that dynamically access the multidimensional radio spectrum using agile waveforms.

A need thus exists for methods and systems that are capable of assessing the idle multidimensional radio spectrum across a geographic region of interest. These methods and systems must decouple the multidimensional nature of radio spectrum from its use by existing wireless technologies. Further, these methods and system must base their assessment of the idle multidimensional radio spectrum access on a large-scale sampling of geo-referenced locations across the geographic region. These methods and systems must additionally quantify idle radio spectrum access not only in terms of contiguous frequency bands or channels, but non-contiguously in terms of frequency, time, polarization, waveform design, spatial orientation, and spatial location.

These novel methods and systems are beneficial to wireless networks composed of conventional wireless devices that access the multidimensional radio spectrum in contiguous bands of frequency and time. When used within such conventional wireless networks, these methods and systems quantify radio spectrum capacity in a manner not available through existing radio engineering planning tools.

These novel methods and systems are especially beneficial to the next generation of dynamic spectrum access systems that are capable of accessing the multidimensional radio spectrum using "agile" waveforms. These novel methods and systems generate both contiguous and non-contiguous representations of the idle multidimensional radio spectrum access across a geographic region. Thus, they capitalize upon the ability of emerging technologies to dynamically access the multidimensional radio spectrum in terms of non-contiguous blocks of frequency, time, polarization, waveform design, spatial orientation, and spatial location.

BRIEF SUMMARY OF THE INVENTION

In one aspect, the invention is a method for quantifying idle radio spectrum access across a geographic region. The method of the present invention selects geo-referenced locations within the geographic region to form a geo-referenced set of observation locations. Independently, geo-referenced coverage areas for one or more wireless devices within the geographic region are integrated to form an assessment of multidimensional radio spectrum conditions across the geographic region. The method then computes geo-referenced portions of idle multidimensional radio spectrum access across the geographic region. The computations may utilize any combination of matrix-oriented, sparse-array, and linked-list representations of multidimensional radio spectrum access. Further, the geo-referenced portions of idle multidimensional radio spectrum access may represent contiguous or non-contiguous portions of radio spectrum access. The method may additionally display the geo-referenced portions of idle multidimensional radio spectrum access in terms of spatial and aggregate statistics.

In another aspect, the invention is a system for quantifying idle radio spectrum access across a geographic region. Geo-referenced locations within the geographic region are selected to form a geo-referenced set of observation locations. The system then independently integrates geo-referenced coverage areas for one or more wireless devices within the geographic region to form an assessment of multidimensional radio spectrum conditions across the geographic region. Geo-referenced portions of idle multidimensional radio spectrum access are then computed across the geographic region. The computations may utilize matrix-oriented, sparse-array, and linked-list representations of multidimensional radio spectrum access, and the system may compute the geo-referenced portions of idle multidimensional radio spectrum access in a contiguous or a non-contiguous fashion. The system may additionally express the geo-referenced portions of the idle multidimensional radio spectrum access using spatial and aggregate statistics. Further, the system may comprise a local wireless transceiver having at least a physical-layer transmit functionality and a physical-layer receive functionality. The local wireless transceiver may also be configured to operate according to a set of radio spectrum access parameters selected from the geo-referenced portions of the idle multidimensional radio spectrum access.

Further embodiments, features, and advantages of the present invention, as well as the structure and operation of the various embodiments of the present invention are described in detail below with reference to the accompanying drawings.

BRIEF DESCRIPTION OF THE DRAWINGS

The accompanying drawings, which are incorporated in and constitute part of the specification illustrate embodiments of the invention and, together with the general description given above and the detailed description of the embodiments given below, serve to explain the principles of the present invention. In the drawings.

DETAILED DESCRIPTION OF THE INVENTION

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
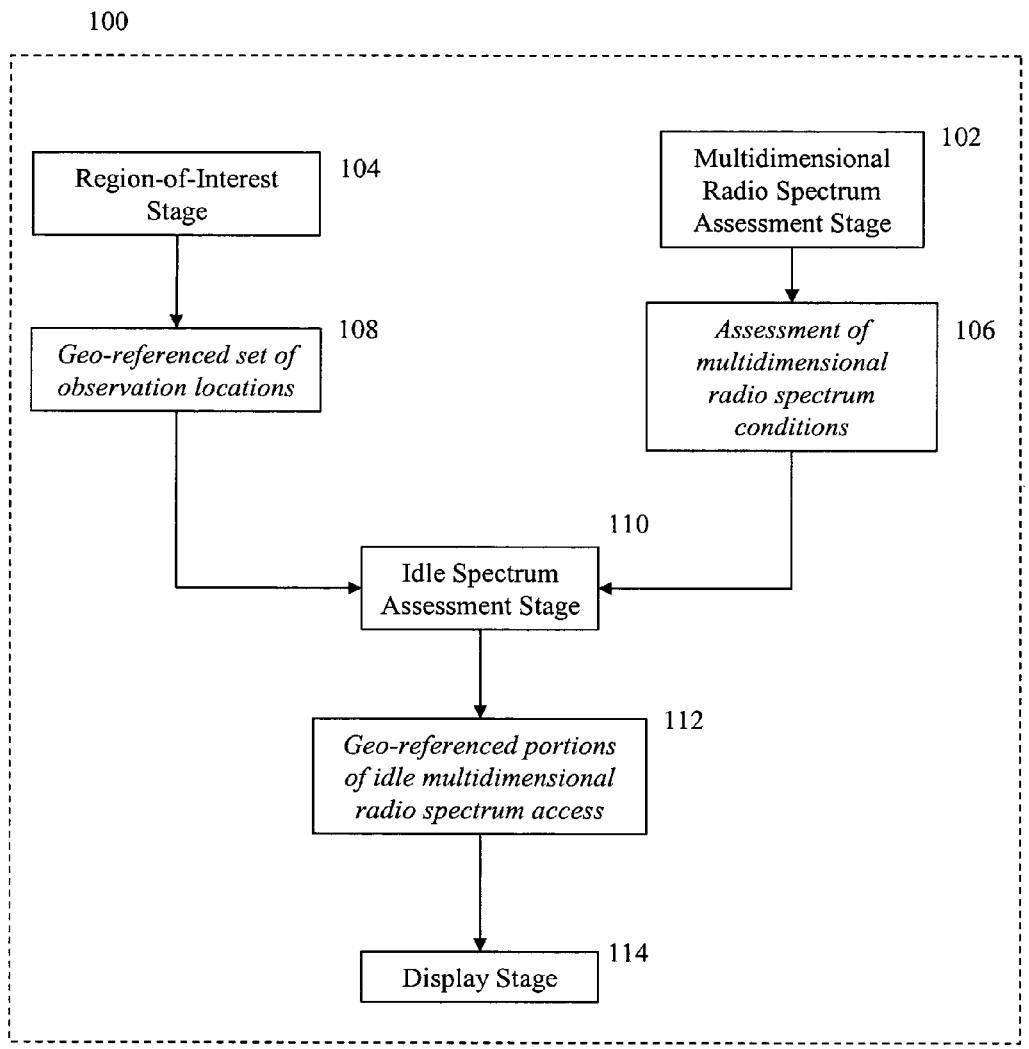
FIG. 1 is an exemplary method of practicing an embodiment of the present invention.

FIG. 1 is an illustration of an exemplary method 100 for quantifying idle radio spectrum access across a geographic region in accordance with the present invention. In FIG. 1, a multidimensional radio spectrum assessment stage computes an assessment of multidimensional radio spectrum conditions across the geographic region in step 102. Independently, a geo-referenced set of observation locations is generated from a region-of-interest stage in step 104. The multidimensional radio spectrum assessment stage 102 and the region-of-interest stage 104 are both independent steps within the exemplary method 100, and thus they may be executed in parallel, as shown in FIG. 1, or they may be executed in a sequential fashion.

An assessment of multidimensional radio spectrum conditions 106 and a geo-referenced set of observation locations 108 are then passed to an idle radio spectrum assessment stage in step 110. The idle radio spectrum assessment stage 110 computes geo-referenced portions of idle multidimensional radio spectrum access across a geographic region 112. The geo-referenced portions of idle multidimensional radio spectrum access 112 may then be passed into a display stage in step 114. The display stage 114 processes and expresses the idle multidimensional radio spectrum access across the geographic region using any combination of spatial statistics and aggregate statistics.

Figure 2:
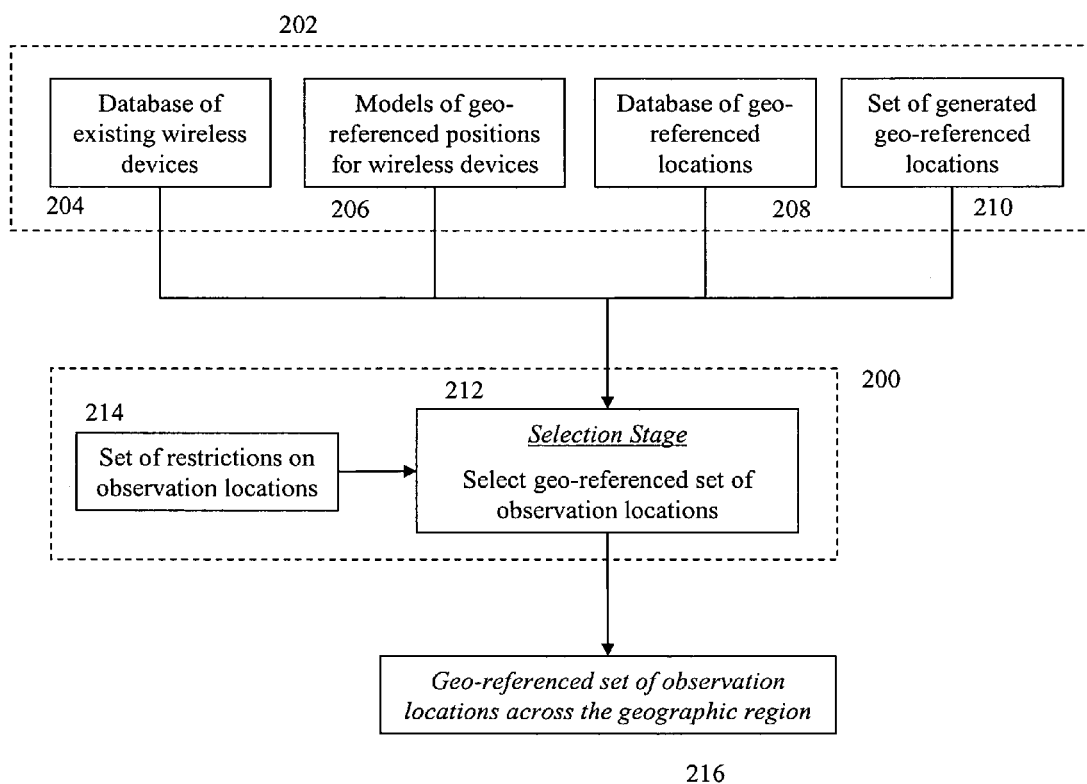
FIG. 2 is a detailed flow chart of a region-of-interest stage that may be incorporated within exemplary method in FIG. 1.

FIG. 2 is a detailed illustration of the region-of-interest stage 200 that can be incorporated within the exemplary method of FIG. 1. In FIG. 2, a geo-referenced set of locations across the geographic region is provided by step 202. The geo-referenced set of locations can represent geo-referenced positions for one or more wireless devices in existence across the geographic region, and these geo-referenced positions may be drawn from a database of existing wireless device positions 204 and from models of existing wireless device positions 206. The models of geo-referenced positions for existing wireless devices 206 may further comprise stochastic models of geo-referenced position and deterministic models of geo-referenced position.

Further, the geo-referenced set of locations provided by step 202 can represent a geo-referenced set of observation points across the geographic region. The set of geo-referenced observation points may be drawn from a number of sources, including a database of geo-referenced locations within the geographic region 208 and a set of generated geo-referenced locations within the geographic region 210.

The region-of-interest stage 200 may additionally account for the movement of mobile wireless devices across the geographic region. A set of geo-referenced locations for mobile wireless devices can form any combination of the geo-referenced positions for existing wireless devices and the geo-referenced set of observation points provided by step 202. Further, the mobility of these mobile wireless devices can be described using either a stochastic model of mobile wireless device position or a deterministic model of mobile wireless device position (e.g., a trajectory of a moving vehicle or a set of waypoints for an aircraft).

The geo-referenced set of locations provided by step 202 is then passed to a selection stage in step 212, which selects a geo-referenced set of observation locations 216. The selection stage in step 212 may incorporate a set of specific selection criteria 214, including at least a set of restrictions on observation locations across the geographic region (e.g., a set of restrictions to exclude observation locations that are outside a particular geo-political boundary). The geo-referenced set of observation locations 216 may be expressed with any combination of vector geo-data and raster geo-data. Upon selection, the geo-referenced set of observation locations 216 is passed to the idle spectrum assessment stage of the exemplary method of FIG. 1.

Figure 3:
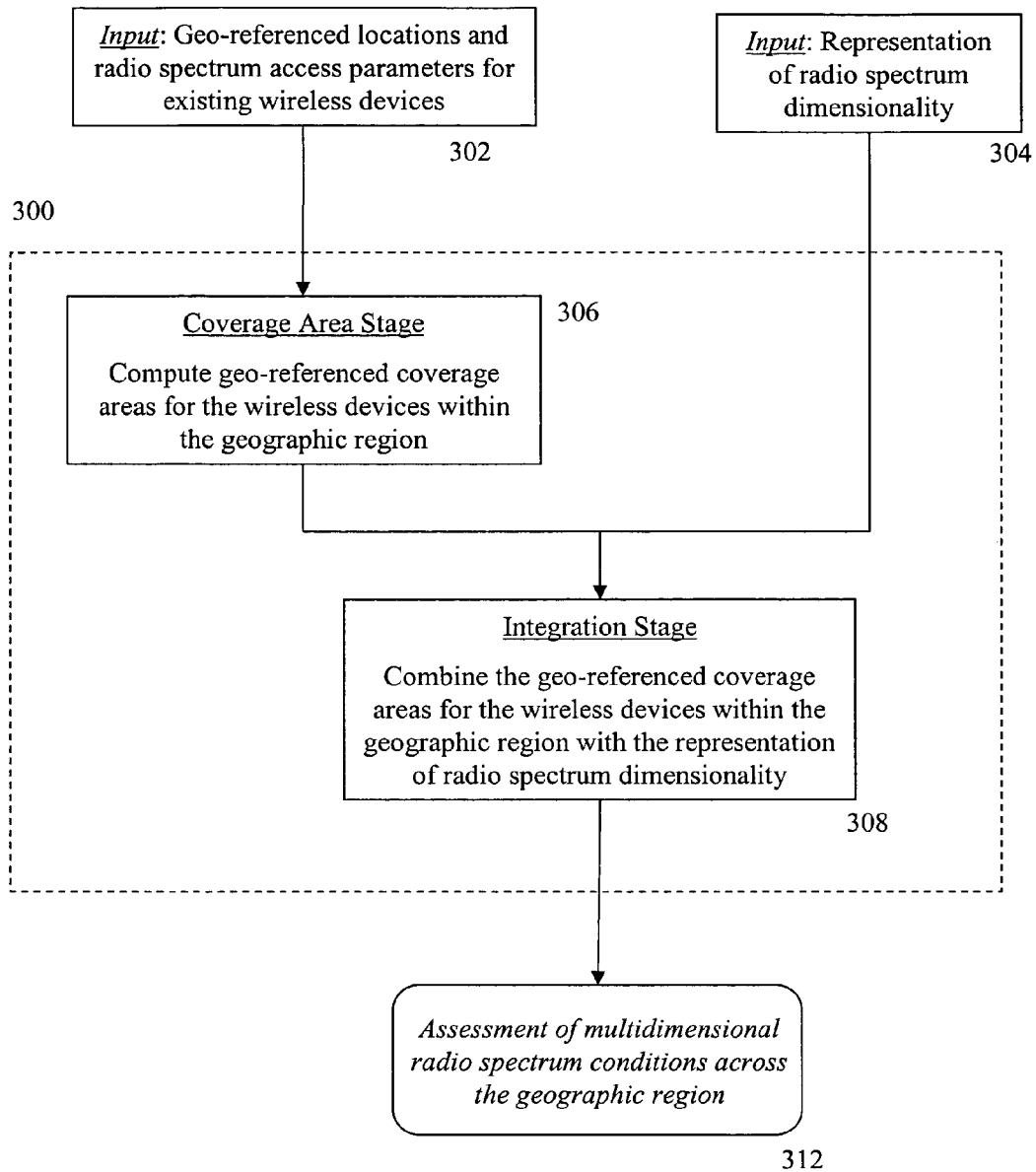
FIG. 3 is a detailed flow diagram of a multidimensional radio spectrum assessment stage that may be incorporated within exemplary method in FIG. 1.

FIG. 3 is a detailed illustration of the multidimensional radio spectrum assessment stage 300 that may be incorporated within the exemplary method of FIG. 1. In FIG. 3, step 302 provides a set of geo-referenced locations and radio spectrum access parameters for the one or more wireless devices in existence across the geographic region. The one or more existing wireless devices may be fixed in geographic position, or they may be mobile wireless devices that move across the geographic region. The set of geo-referenced locations for the existing wireless devices may be obtained from a number of sources, including a database of existing wireless devices within the geographic region, a stochastic model of existing wireless device positions within the geographical region, and a deterministic model of existing wireless device positions within the geographical region. In a similar fashion, sources for the set of radio spectrum access parameters may include a database of radio spectrum access parameters for existing wireless devices within the geographic region, a stochastic model of radio spectrum access parameters for existing wireless devices within the geographic region, and a deterministic model of radio spectrum access parameters for existing wireless devices within the geographic region.

The set of geo-referenced locations and radio spectrum access parameters for the existing wireless devices within the geographic region are then passed to a coverage area stage in step 306, which computes geo-referenced coverage areas for the one or more wireless devices in existence across the geographic region. A representation of radio spectrum dimensionality is provided within step 304. This representation, along with the computed geo-referenced coverage areas, is passed to an integration stage in step 308. The integration stage 308 combines the computed geo-referenced coverage areas for the existing wireless devices with the provided representation of radio spectrum dimensionality to form an assessment of multidimensional radio spectrum conditions across the geographic region 310. This assessment 310 may then be passed to the display stage of the exemplary method of FIG. 1.

The representation of radio spectrum dimensionality provided within step 304 may characterize radio spectrum as a multidimensional space with coordinates of frequency, time, polarization, waveform design, spatial orientation, and spatial location. The waveform design coordinate relates to an orthogonal modulation of the multidimensional radio spectrum and to any parameters that are associated with the orthogonal modulation. Further, the spatial location coordinate may be defined in geographic coordinates of latitude, longitude, and altitude, and the spatial location coordinate is distinct from the spatial orientation coordinate (i.e., the direction in which an antenna faces).

Figure 4:
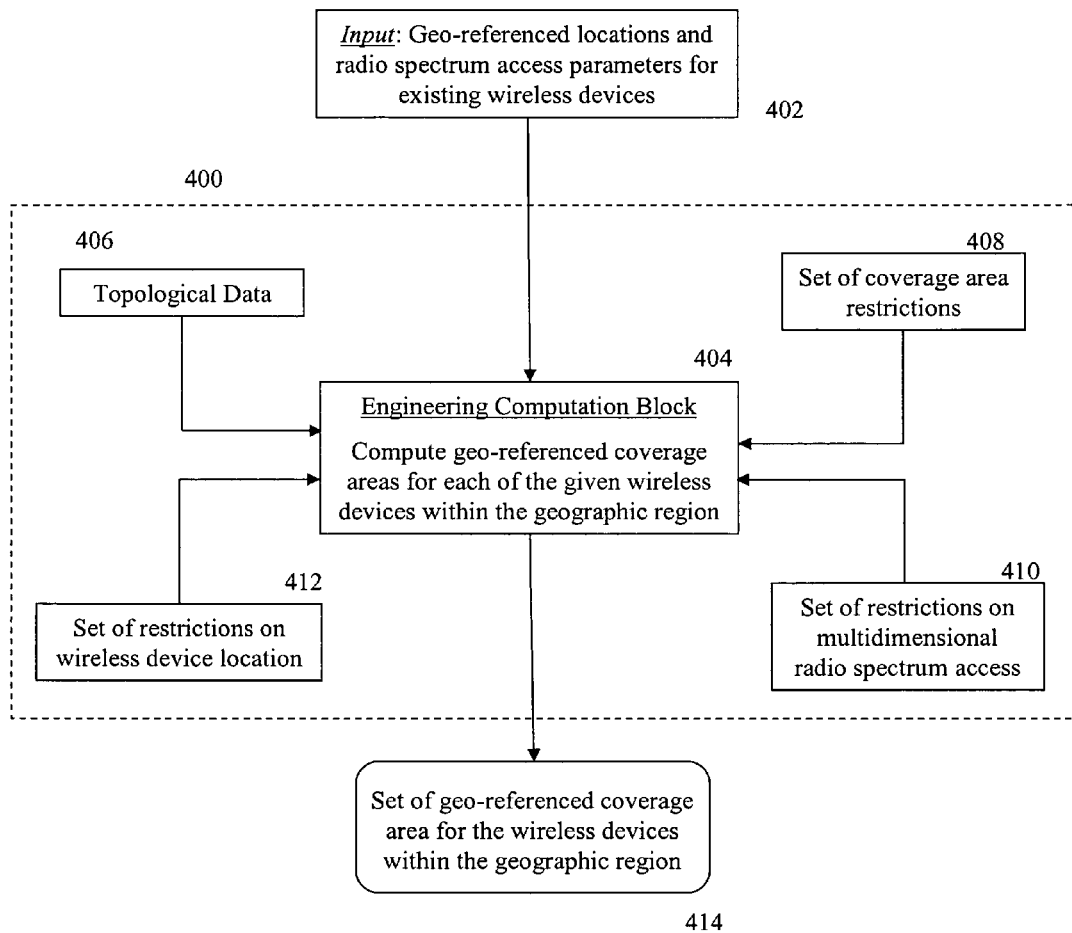
FIG. 4 is a detailed flow diagram of an coverage area stage that may be incorporated within exemplary multidimensional radio spectrum assessment stage in FIG. 3.

FIG. 4 is a detailed illustration of the coverage area stage 400 that may be incorporated within the exemplary multidimensional radio spectrum assessment stage of FIG. 3. In FIG. 4, the set of geo-referenced locations and radio spectrum access parameters for existing wireless devices within the geographic region is provided in step 402. The set of geo-referenced locations and radio spectrum access parameters from step 402 is then passed to an engineering computation block in step 404, which computes a set of geo-referenced coverage areas 414 for each of the one or more wireless devices in existence across the geographic region.

Topological data 406 may be incorporated into the engineering calculation block 404 to improve its fidelity to actual geographic conditions. The topological data 406 may be obtained from a number of sources, including a database of topology across the geographic region, a stochastic model of topology across the geographic region, and a deterministic model of topology across the geographic region.

Further, the engineering computation block 404 may incorporate a set of restrictions on the geo-referenced coverage areas 408. For example, these restrictions may serve to limit the geo-referenced coverage areas to specific geo-political boundaries. Additionally, a set of restrictions on multidimensional radio spectrum access across a geographic region 410 and a set of restrictions on the location of wireless devices within a geographic region 412 may be incorporated into the engineering computation block 404. The set of restrictions on the location of wireless devices within the geographic region may also include the set of restrictions on observation locations within the geographic region 412. The engineering computation block 404 may further incorporate criteria that define a viable radio link between individual wireless devices (such as signal strength, signal-to-noise and interference ratio (SNIR), and bit error rate (BER)).

The set of geo-referenced coverage areas 414 may be expressed through any combination of vector geo-data and raster-geo-data, as some portions of the analysis may be best framed using a hybrid combination of vector and raster geo-data (e.g., a polygon-vector structure for the set of coverage-area restrictions 410 and a gridded-raster structure for the geo-referenced locations of existing wireless devices 402). The computed set of geo-referenced coverage areas for the existing wireless devices within the geographic region 412 is then passed back to the exemplary multidimensional radio spectrum assessment stage of FIG. 3.

Figure 5:
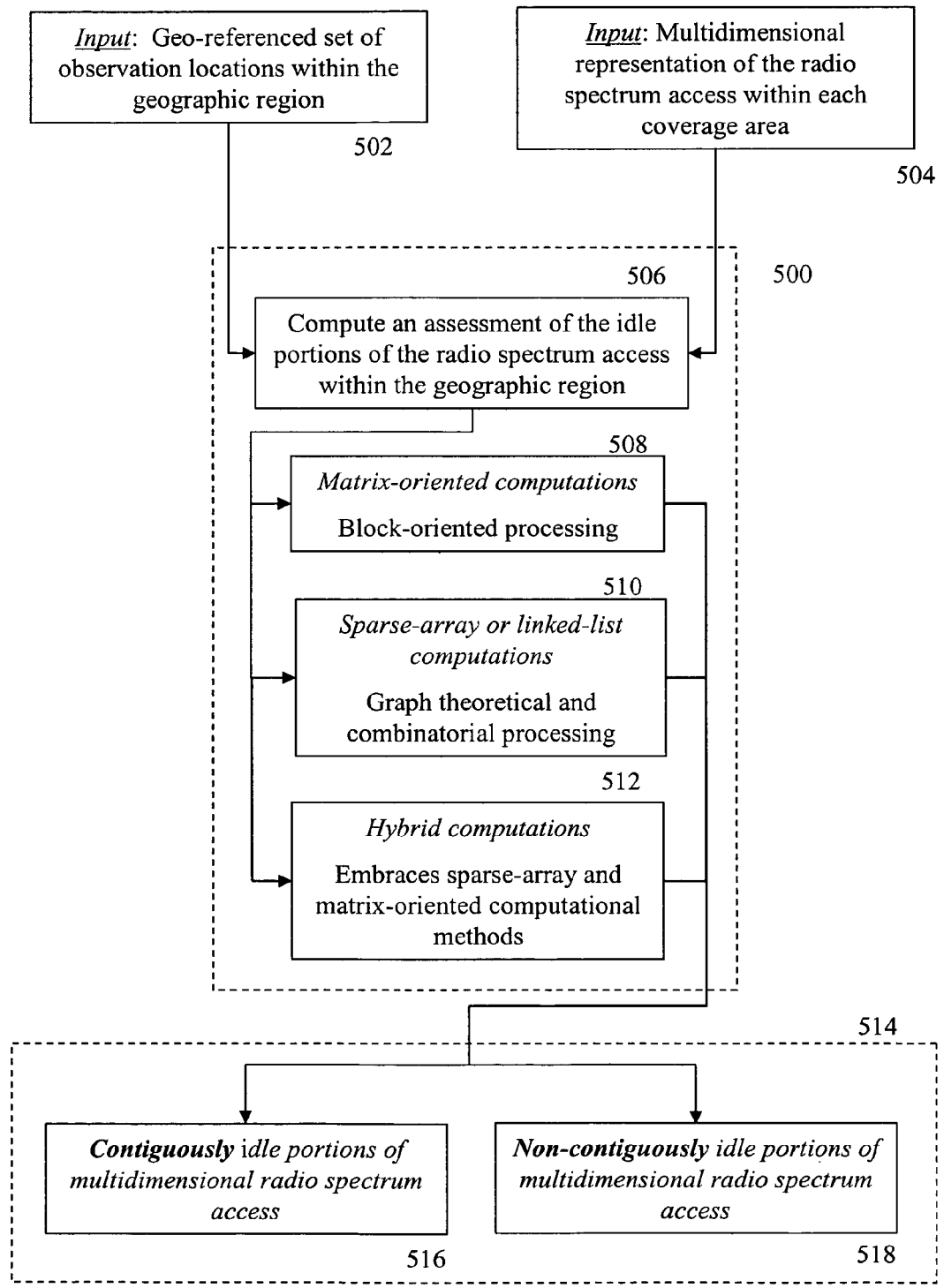
FIG. 5 is a detailed flow diagram of an idle radio spectrum assessment stage that may be incorporated within exemplary method in FIG. 1.

FIG. 5 is a detailed illustration of an idle spectrum assessment stage 500 that may be incorporated into the exemplary method of FIG. 1. In FIG. 5, a geo-referenced set of observation locations within the geographic region is provided in step 502, and a multidimensional representation of radio spectrum conditions across the geographic region is provided in step 504. The geo-referenced set of observation locations and the multidimensional representation of radio spectrum conditions are then passed into step 506, which computes the geo-referenced portions of idle multidimensional radio spectrum access across the geographic region 514.

Depending upon the density of the geo-referenced observation locations and the geo-referenced wireless device locations, the computation within step 506 may utilize matrix-oriented representations of multidimensional radio spectrum access, sparse-array or linked-list representations of multidimensional radio spectrum access, or a hybrid representation of radio spectrum access that combines elements of both a matrix-oriented and a sparse-array representation of multidimensional radio spectrum access.

Computations using matrix-oriented representations of multidimensional radio spectrum access 508 (e.g., dense-matrix representations) enjoy the efficiencies of block-oriented processing, especially when applying Boolean set operations to individual subspaces of the multidimensional radio spectrum. Computations of the idle multidimensional radio spectrum access using sparse-matrix or linked-list representations 510 often resemble the well-known problem of spanning trees in a graph. In this particular case, the vertices of the graph tree represent n-tuples in multidimensional radio spectrum space, and the edges of the graph trees represent openings (or "idleness") between a given pair of n-tuples.

Further, the geo-referenced portions of idle multidimensional radio spectrum access 514 may represent either a contiguous 516 or a non-contiguous 518 representation of idle multidimensional radio spectrum access. The contiguous representation 516 is most relevant to conventional wireless devices that access radio spectrum using contiguous bands of frequency and time. The non-contiguous representation 518 is especially relevant to emerging technologies that that are capable of non-contiguously accessing the multidimensional radio spectrum and that are capable of dynamically adjusting their radio spectrum access parameters in response to changing network conditions.

The geo-referenced portions of idle multidimensional radio spectrum access 514 may be expressed through any combination of vector geo-data and raster geo-data, as some portions of the analysis are best framed as a hybrid of vector and raster geo-data. The geo-referenced portions of idle multidimensional radio spectrum access 516 may then be passed to the display stage of the exemplary method of FIG. 1.

Figure 6:
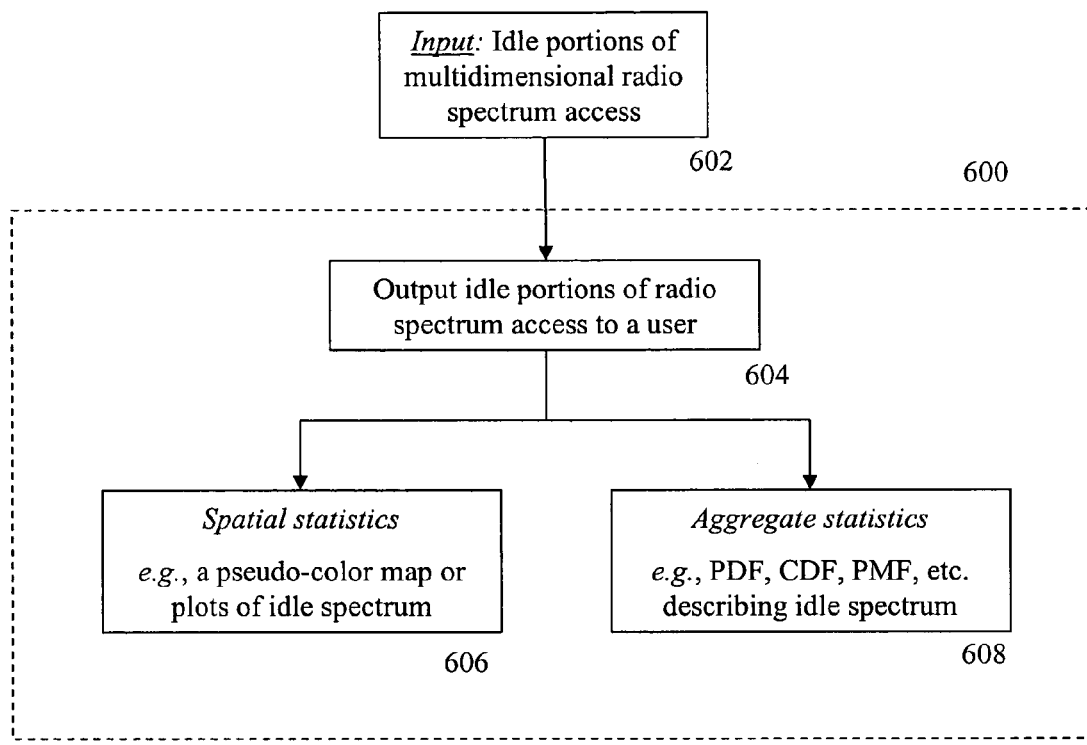
FIG. 6 is a detailed flow diagram of a display stage that may be incorporated within exemplary method in FIG. 1.

FIG. 6 is a detailed illustration of a display stage 600 that may be incorporated into the exemplary method of FIG. 1. In FIG. 6, the geo-referenced portions of idle radio spectrum access across the geographic region are provided in step 602. The geo-referenced portions of multidimensional radio spectrum access are then processed and displayed in step 604 using any combination of spatial statistics in step 606 and aggregate statistics in step 608. The spatial statistics within step 606 may include a geo-referenced, pseudo-color map of the idle portions of multidimensional radio spectrum access and plots of the idle multidimensional radio spectrum access across the geographic region. The aggregate statistics in step 608 describe a probabilistic nature of the idle multidimensional radio spectrum access across the geographic region, and the aggregate statistics may include at least one of a cumulative distribution function (CDF), a probability distribution function (PDF), and a probability mass function (PMF).

Figure 7:
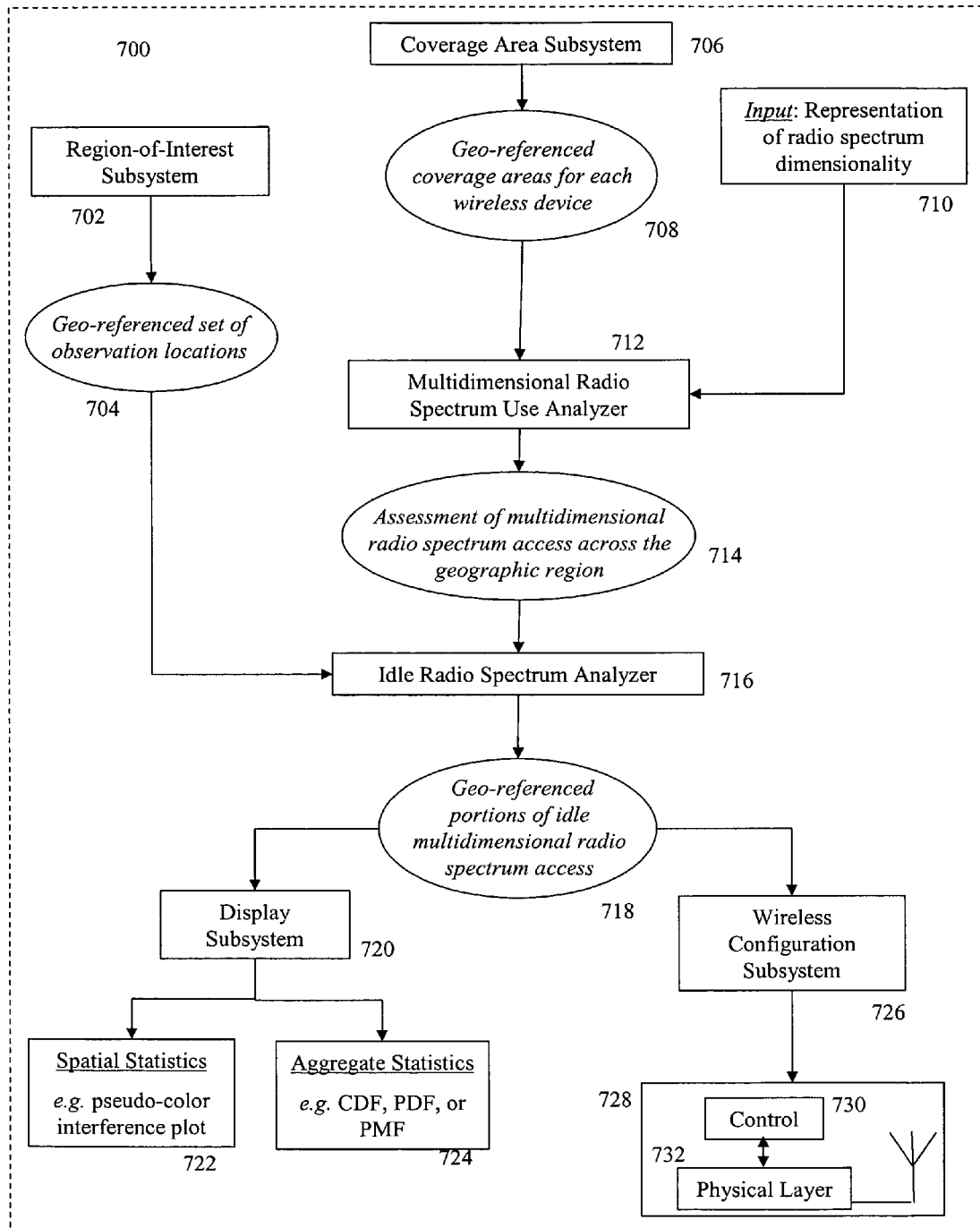
FIG. 7 is an exemplary system for practicing an embodiment of the present invention.

FIG. 7 is an illustration of an exemplary system 700 that is capable of quantifying the idle radio spectrum access across a geographic region. In FIG. 7, a region-of-interest subsystem 702 selects a geo-referenced set of observation locations 704 across the geographic region. The system 700 in FIG. 7 also comprises a coverage area subsystem 706, which independently computes a set of geo-referenced coverage areas 708 for one or more wireless devices in existence across the geographic region. The geo-referenced set of observation locations 704 and the set of geo-referenced coverage areas 708 may be expressed through any combination of vector geo-data and raster geo-data, as some elements of the analysis are best suited to combinations of vector and raster geo-data.

The system 700 also provides a representation of radio spectrum dimensionality 710, which may characterize radio spectrum as a multidimensional space with coordinates of frequency, time, polarization, waveform design, spatial orientation, and spatial location. The representation of radio spectrum dimensionality 710 and set of geo-referenced coverage areas for existing wireless devices 708 are then passed to a multidimensional radio spectrum use analyzer 712.

The multidimensional radio spectrum use analyzer 712 integrates the set of coverage areas for existing wireless devices 708 with the representation of radio spectrum dimensionality 710 to form an assessment of multidimensional radio spectrum conditions across the geographic region 714. The assessment of multidimensional radio spectrum conditions 714, along with the geo-referenced set of observation locations 704, is then passed to an idle multidimensional radio spectrum analyzer 716. The region-of-interest subsystem 702 and the multidimensional radio spectrum use analyzer 714 represent individual inputs to the idle multidimensional radio spectrum analyzer 716. Thus, they may be executed in parallel, as is shown in FIG. 7, or they may be executed in a sequential fashion.

The idle multidimensional spectrum analyzer 716 computes geo-referenced portions of idle multidimensional radio spectrum access 718 across the geographic region. Depending upon the density of the observation and the wireless device locations, the computations in the idle multidimensional spectrum analyzer 718 may favor matrix-oriented representations of multidimensional radio spectrum access, sparse-array or linked-list representations of multidimensional radio spectrum access, or a hybrid representation of radio spectrum access that combines elements of both the matrix-oriented and the sparse-array representation of multidimensional radio spectrum access.

Computations using the matrix-oriented representations of multidimensional radio spectrum access (e.g., dense-matrix-oriented representations) may enjoy the efficiencies of block-oriented processing, especially when applying Boolean set operations to subspaces of the multidimensional radio spectrum. Computations of the idle multidimensional radio spectrum access using the sparse-array or the linked-list representations often resemble the well-known problem of spanning trees in a graph, in which vertices of the graph tree represent n-tuples of multidimensional radio spectrum space and edges of the graph trees represent the openings (or "idleness") between a given pair of n-tuples.

Further, the geo-referenced portions of idle multidimensional radio spectrum access 718 may represent any combination of a contiguous and a non-contiguous representation of idle multidimensional radio spectrum access. The geo-referenced portions of idle multidimensional radio spectrum access 718 may additionally be expressed through at least one of vector geo-data, raster geo-data, and a hybrid combination of vector and raster geo-data.

The geo-referenced portions of idle multidimensional radio spectrum access 718 may then be passed to a display subsystem 720, which displays the geo-referenced portions of idle multidimensional radio spectrum access through a combination of spatial statistics 728 and aggregate statistics 730. The spatial statistics 728 display the idle portions of multidimensional radio spectrum access across -the -geographic region using a geo-referenced, pseudo-color interference map of idle multidimensional radio spectrum access and plots of the idle multidimensional radio spectrum access. The aggregate statistics 730 describe a probabilistic nature of the idle radio spectrum access across the geographic region using any combination of CDFs, PDFs, and PMFs.

The geo-referenced portions of idle multidimensional radio spectrum access 718 may be additionally passed into a wireless configuration subsystem 726. Within the wireless communications subsystem 726, a set of radio spectrum access parameters is selected from within the geo-referenced portions of idle multidimensional radio spectrum access 718. The selected set of radio spectrum access parameters is then passed to a local wireless device 728 that possesses a physical layer functionality to transmit messages, a physical layer functionality to receive messages, or a physical layer functionality to transmit and to receive messages. The control structures 730 of the physical layer functionalities 732 of the local wireless device 728 are then configured to operate in accordance with the selected set of radio spectrum access parameters.

Figure 8:
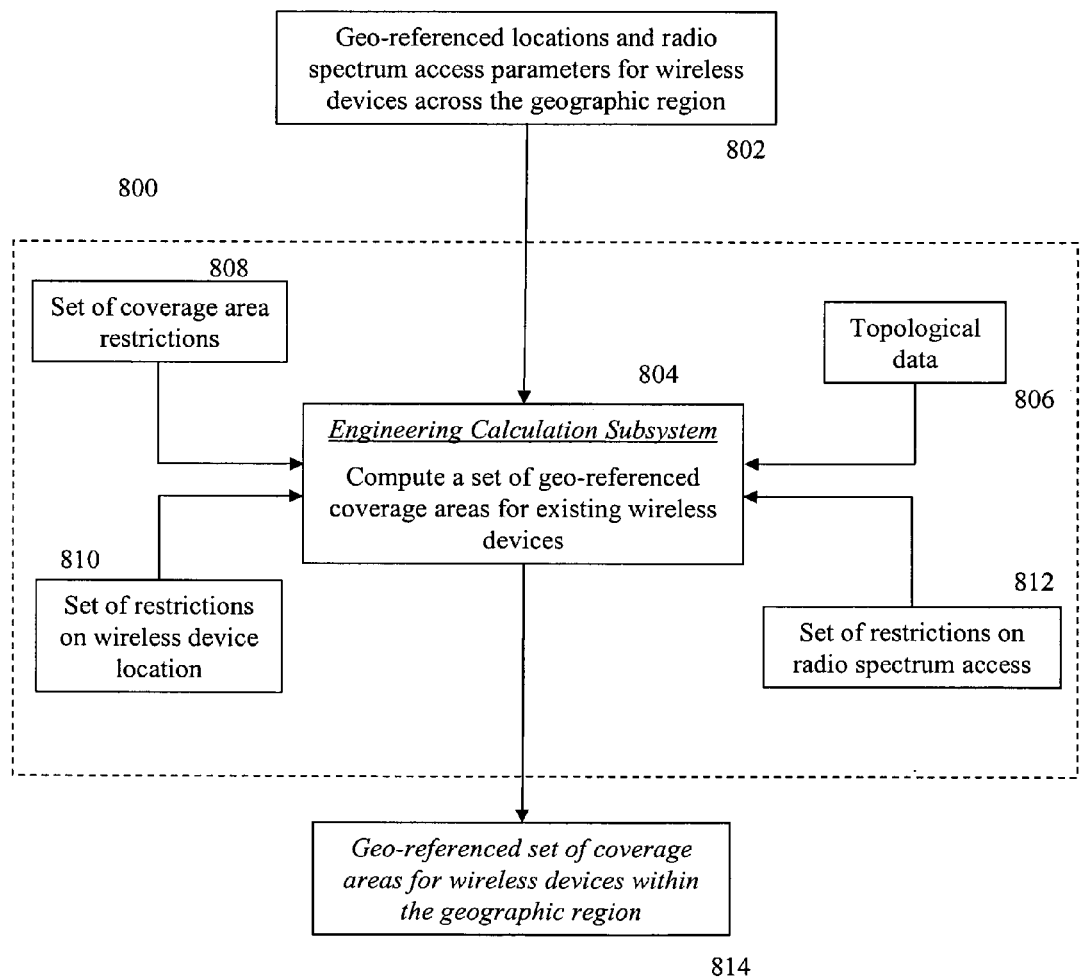
FIG. 8 is a detailed illustration of a coverage area subsystem that may be incorporated within exemplary system of FIG. 7.

FIG. 8 is a detailed diagram of a coverage area subsystem 800 that may be incorporated within the exemplary system of FIG. 7. In FIG. 8, a set of geo-referenced positions and radio spectrum access parameters 802 are provided for the one or more existing wireless devices within the geographic region. The one or more existing wireless devices may be fixed in geographic position, or they may be mobile wireless devices that move throughout the geographic region. Sources for the set of geo-referenced locations 802 may include a database of existing wireless devices within the geographic region, a stochastic model of existing wireless device positions within the geographical region, and a deterministic model of existing wireless device positions within the geographical region.

The set of radio spectrum access parameters 802 may be obtained from a similarly large number of sources. These sources include at least one of a database of the radio spectrum access parameters for existing wireless devices within the geographical area, a stochastic model of radio spectrum access parameters for existing wireless devices within the geographical area, and a deterministic model of radio spectrum access parameters for existing wireless devices within the geographical area.

The set of geo-referenced locations and radio spectrum access parameters 802 are then are passed to an engineering calculation subsystem 804, which computes the set of geo-referenced coverage areas 812 for the one or more wireless devices within the geographic region. The set of geo-referenced coverage areas 812 may be expressed through any combination of vector geo-data and raster geo-data, as some elements of the analysis are best expressed using the hybrid combination of vector and raster geo-data.

The engineering calculation subsystem 804 may improve its fidelity to actual geographic conditions by incorporating topological data on the geographic region 806. The topological data 806 may be obtained from a number of sources, including a database of topology across the geographic region, a stochastic model of topology across the geographic region, and a deterministic model of topology across the geographical region.

The engineering calculation subsystem 804 may additionally incorporate a set of restrictions 808 on geo-referenced coverage areas within the geographic region. For example, the set of restrictions on geo-referenced coverage areas can serve to restrict the computation of coverage areas outside of a particular geo-political boundary. Further, a set of restrictions on the locations of existing wireless devices across the geographic region 810 may be incorporated into the engineering calculation subsystem, along with a set of restrictions on multidimensional radio spectrum access across the geographic region 812. The set of restrictions on wireless device location may also include a set of restrictions on geo-referenced observation locations across the geographic region. The resulting set of geo-referenced coverage areas for wireless devices within the geographic area 814 are then passed to the exemplary system of FIG. 7.

Figure 9:
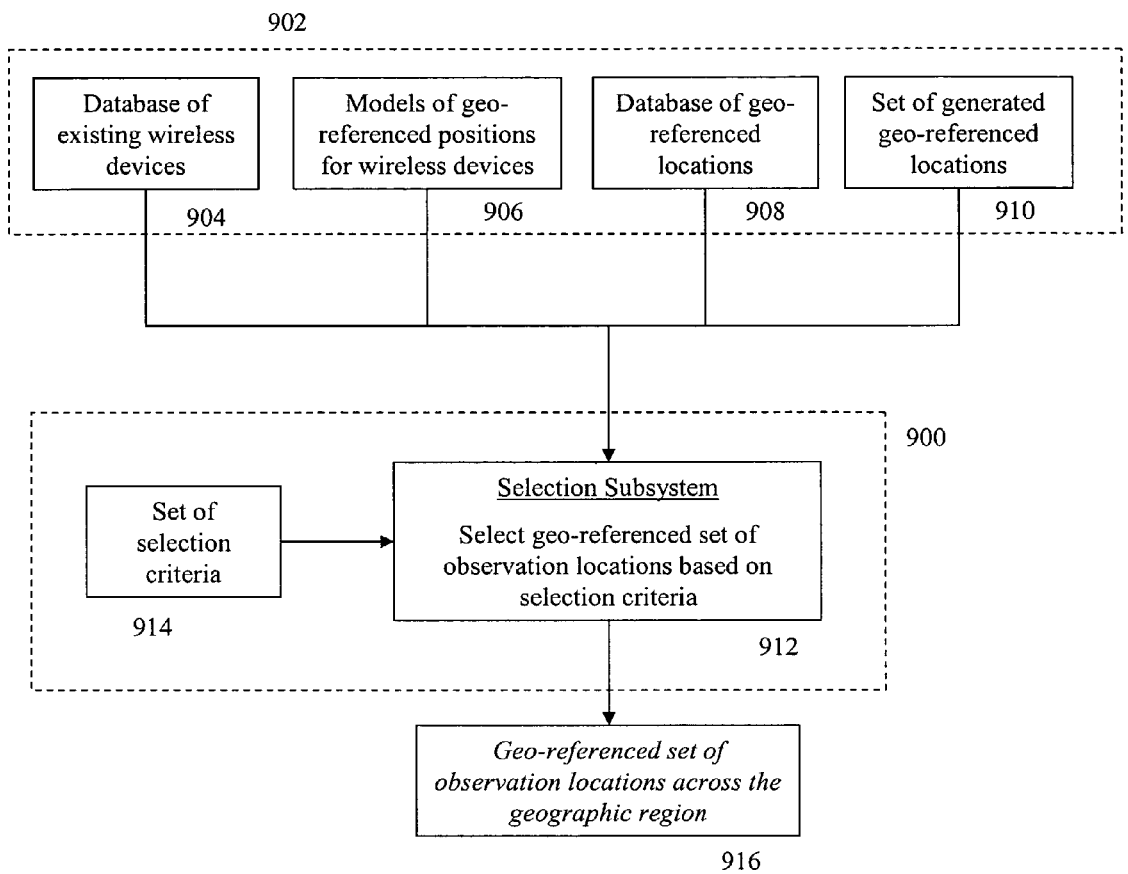
FIG. 9 is a detailed illustration of a region-of-interest subsystem that may be incorporated within exemplary system of FIG. 7.

FIG. 9 is a detailed illustration of a region-of-interest subsystem 900 that can be incorporated within the exemplary system of FIG. 7. In FIG. 9, the exemplary system provides a geo-referenced set of locations 902. The geo-referenced set of locations 902 can represent geo-referenced positions for one or more wireless devices in existence across the geographic region, and these geo-referenced positions may be drawn from a database of existing wireless device positions 904 and from models of existing wireless device positions 906. The models of geo-referenced positions for existing wireless devices 906 may further comprise stochastic models of geo-referenced position and deterministic models of geo-referenced position.

Further, the geo-referenced set of locations 902 can represent a set of geo-referenced observation points across the geographic region. The set of geo-referenced observation points may be drawn from a number of sources, including a database of geo-referenced locations within the geographic region 908 and a set of generated geo-referenced locations within the geographic region 910.

The region-of-interest subsystem 900 may additionally account for the movement of mobile wireless devices across the geographic region. A set of geo-referenced locations for mobile wireless devices can form any combination of the geo-referenced positions for existing wireless devices and the geo-referenced set of observation points. Further, the mobility of these mobile wireless devices may be described using either a stochastic model of mobile wireless device position or a deterministic model of mobile wireless device position (e.g., a trajectory of a moving vehicle or a set of waypoints for an aircraft).

The set of geo-referenced locations 902 is then passed to a selection subsystem in step 912, which selects a geo-referenced set of observation locations 916. The selection subsystem 912 may incorporate a set of specific selection criteria 914, including at least the set of restrictions on observation locations across the geographic region (e.g., a set of restrictions to exclude observation points that are outside a particular geo-political boundary). The geo-referenced set of observation locations 916 may be expressed using any combination of vector geo-data and raster geo-data. Upon selection, the geo-referenced set of observation locations 216 is passed to the idle radio spectrum analyzer of the exemplary system of FIG. 7.

Figure 10:
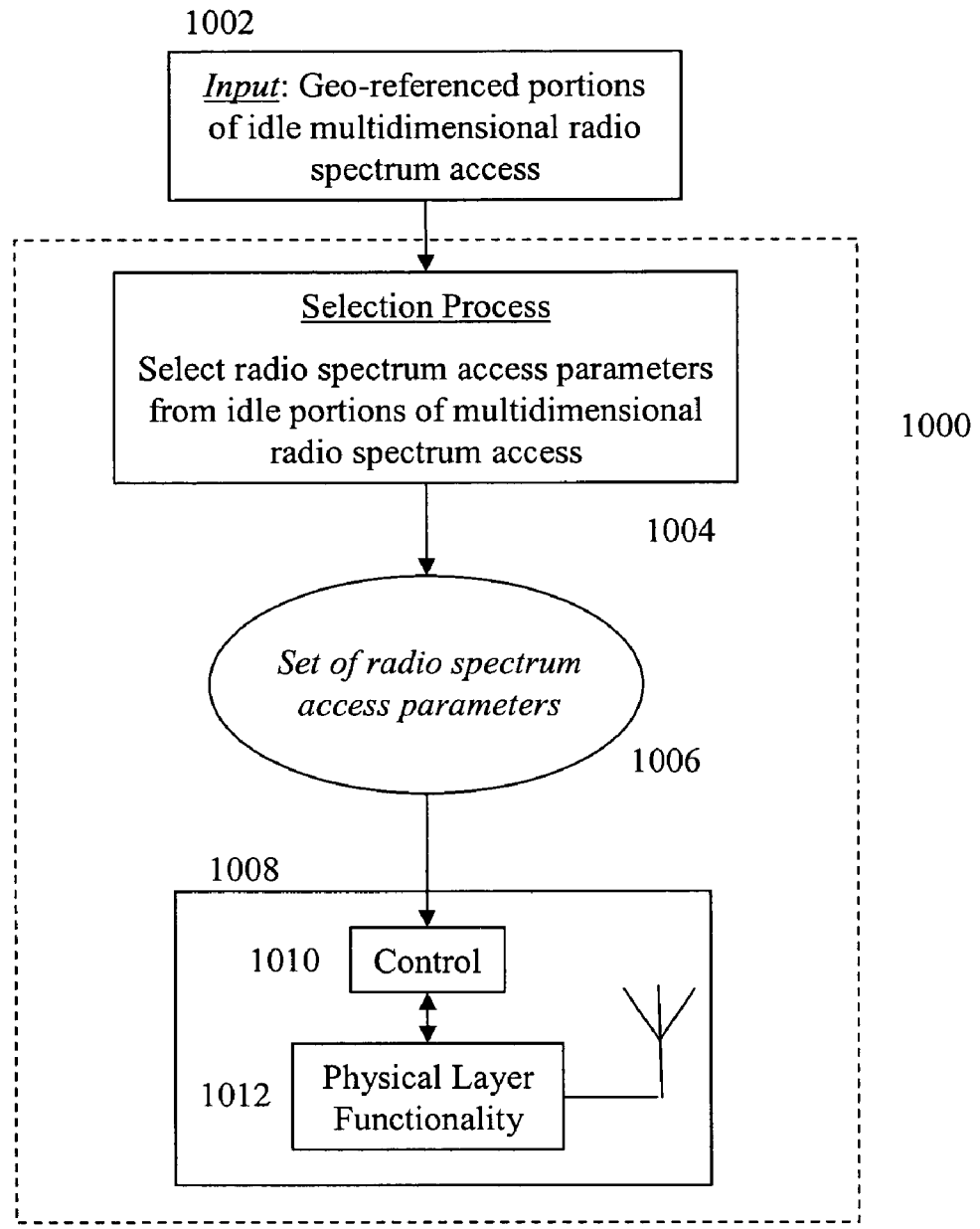
FIG. 10 is a detailed illustration of a configuration subsystem that may be incorporated within exemplary system of FIG. 7.

FIG. 10 is a detailed diagram of a configuration subsystem 1000 that may be incorporated within the exemplary system of FIG. 7. In FIG. 10, the geo-referenced portions of the idle multidimensional radio spectrum access 1002 are passed to a selection process 1004, which selects a set of radio spectrum access parameters 1006 from within the geo-referenced portions of the idle multidimensional radio spectrum. The selected set of radio spectrum access parameters 1006 is passed to the local wireless device 1008. The local wireless device 1008 may possess at least a physical layer functionality to transmit messages, a physical layer functionality to receive messages, or a physical layer functionality to transmit and receive messages. The control structures 1010 of the physical layer functionality 1012 of the local wireless device 1008 are then adjusted to operate in accordance with the selected set of radio spectrum access parameters 1004.

CONCLUSION

The present invention provides a method for quantifying the idle portions of the multidimensional radio spectrum access within a geographic region. The present invention also provides a system through which the idle portions of the multidimensional radio spectrum access are quantified across a geographical region.

The present invention decouples the multidimensional nature of the radio spectrum from both existing radio spectrum access technologies and existing assessments of idle radio spectrum access. The decoupling of the multidimensional nature of the radio spectrum from the devices which access that spectrum allows the present invention to be broadly applicable to both conventional and non-conventional means of radio spectrum access.

The present invention also characterizes the idle multidimensional radio spectrum through conventional means, such as contiguous blocks of channels, and through less conventional, non-contiguous means of radio spectrum access. In this fashion, the present invention is relevant to both conventional wireless technologies and emerging "smart" radio technologies that utilize dynamic means to agilely access radio spectrum resources.

The present invention also develops efficient block-processing, graph-theoretical, and combinatorial methods for computing the idle portions of the multidimensional radio spectrum across the geographic region. These methods efficiently manipulate both vector geo-data and raster geo-data, thereby significantly broadening the utility of the present invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art (including the contents of any references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

I claim:

1. A method for quantifying idle radio spectrum access across a geographic region, comprising:
   selecting geo-referenced locations within the geographic region to form a geo-referenced set of observation locations;
   determining geo-referenced locations of wireless devices inside the geographic location;
   receiving radio spectrum access parameters for the wireless devices;
   computing geo-referenced coverage areas for the wireless devices based on the received radio spectrum access parameters and the determined geo-referenced locations of the wireless devices;
   integrating the computed geo-referenced coverage areas with a representation of radio spectrum dimensionality to form an assessment of multidimensional radio spectrum conditions across the geographic region;
   computing geo-referenced portions of idle multidimensional radio spectrum access across the geographic region based on (i) the geo-referenced set of observation locations and (ii) the assessment of multidimensional radio spectrum conditions across the geographic region; and
   configuring a wireless device to operate according to a set of radio spectrum access parameters selected from the geo-referenced portions of idle multidimensional radio spectrum access across the geographic region.

2. The method of claim 1, further comprising providing a representation of radio spectrum dimensionality with coordinates of at least one of: (i) frequency, (ii) time, (iii) polarization, (iv) waveform design, (v) spatial orientation, and (vi) spatial location.

3. The method of claim 1, further comprising providing geo-referenced locations and radio spectrum access parameters for the one or more wireless devices from at least one of: (i) a database of existing wireless devices within the geographic region, (ii) a stochastic model of existing wireless device positions within the geographical region, (iii) a deterministic model of existing wireless device positions within the geographical region, (iv) a database of the radio spectrum access parameters of existing wireless devices within the geographical area, (v) a stochastic model of the radio spectrum access parameters of existing wireless devices within the geographical area, and (vi) a deterministic model of radio spectrum access parameters of existing wireless devices within the geographical area.

4. The method of claim 3, wherein the geo-referenced set of observation locations are selected from at least one of: (i) the database of existing wireless devices within the geographic region, (ii) a database of geo-referenced locations within the geographic region, and (iii) a set of generated geo-referenced locations across the geographic region.

5. The method of claim 1, wherein the selecting further comprises filtering the geo-referenced set of observation locations according to a set of selection criteria.

6. The method of claim 1, wherein the geo-referenced set of observation locations is expressed with at least one of: (i) vector geo-data and (ii) raster geo-data.

7. The method of claim 2, wherein the geo-referenced coverage areas are calculated on the basis of at least one of: (i) a database of topology across the geographic region, (ii) a stochastic model of topology across the geographic region, (iii) a deterministic model of topology across the geographic region, (iv) a set of restrictions on wireless device locations within the geographic region, (v) a set of restrictions on observation locations within the geographic region, (vi) a set of restrictions on coverage areas within the geographic region, and (vii) a set of restrictions on multidimensional spectrum access within the geographic region.

8. The method of claim 1, wherein the geo-referenced coverage areas are expressed with least one of: (i) vector geo-data and (ii) raster geo-data.

9. The method of claim 1, wherein the geo-referenced portions of idle multidimensional radio spectrum access represent geo-referenced portions of noncontiguous multidimensional radio spectrum access.

10. The method of claim 1, wherein the computing utilizes matrix-oriented representations of multidimensional radio spectrum access.

11. The method of claim 1, wherein the computing utilizes at least one of: (i) sparse-array representations of multidimensional radio spectrum access and (ii) linked-list representations of multidimensional radio spectrum access.

12. The method of claim 1, further comprising expressing the geo-referenced portions of idle multidimensional radio spectrum access in terms of at least one of: (i) spatial statistics, (ii) aggregate statistics, and (iii) a combination of spatial statistics and aggregate statistics.

13. The method of claim 12, wherein the expressing comprises expressing the geo-referenced portions of idle multidimensional radio spectrum access in terms of at least spatial statistics and wherein the spatial statistics include a geo-referenced map of the determined portions of the idle multi-dimensional radio spectrum access across the geographic region.

14. The method of claim 12, wherein the expressing comprises expressing the geo-referenced portions of idle multi-dimensional radio spectrum access in terms of at least aggregate statistics and wherein the aggregate statistics include at least one of (i) a cumulative distribution function (CDF), (ii) a probability density function (PDF), and (iii) a probability mass function (PMF).

15. A system for quantifying idle radio spectrum access across a geographic region, comprising:
 a first module operable to select geo-referenced locations within the geographic region to form a geo-referenced set of observation locations;
 a second module operable to determine geo-referenced locations of wireless devices inside the geographic location;
 a third module operable to receive radio spectrum access parameters for the wireless devices;
 a fourth module operable to compute geo-referenced coverage areas for the wireless devices based the received radio spectrum access parameters and the determined geo-referenced locations of the wireless devices;
 a fifth module operable to integrate the computed geo-referenced coverage areas with a representation of radio spectrum dimensionality to form an assessment of multidimensional radio spectrum conditions across the geographic region; and
 a sixth module operable to compute geo-referenced portions of idle multidimensional radio spectrum access across the geographic region based on (i) the geo-referenced set of observation locations and (ii) the assessment of multidimensional radio spectrum conditions across the geographic region; and
 a seventh module operable to configure a wireless device to operate according to a set of radio spectrum access parameters selected from the geo-referenced portions of idle multidimensional radio spectrum access across the geographic region.

16. The system of claim 15, further comprising an eighth module operable to provide a representation of radio spectrum dimensionality with coordinates of at least one of: (i) frequency, (ii) time, (iii) polarization, (iv) waveform design, and (v) spatial orientation, and (vi) spatial location.

17. The system of claim 15, further comprising an eighth module operable to provide geo-referenced locations and radio spectrum access parameters for the one or more wireless devices from at least one of: (i) a database of existing wireless devices within the geographic region, (ii) a stochastic model of existing wireless device positions within the geographical region, (iii) a deterministic model of existing wireless device positions within the geographical region, (iv) a database of the radio spectrum access parameters of existing wireless devices within the geographical area, (v) a stochastic model of the radio spectrum access parameters of existing wireless devices within the geographical area, and (vi) a deterministic model of radio spectrum access parameters of existing wireless devices within the geographical area.

18. The system of claim 17, wherein the geo-referenced set of observation locations are selected from at least one of: (i) the database of existing wireless devices within the geographic region, (ii) a database of geo-referenced locations within the geographic region, and (iii) a set of generated geo-referenced locations within the geographic region.

19. The system of claim 15, wherein the first module comprises an eighth module operable to filter the geo-referenced set of observation locations according to a set of selection criteria.

20. The system of claim 15, wherein the geo-referenced set of observation locations is expressed with at least one of: (i) vector geo-data and (ii) raster geo-data.

21. The system of claim 16, wherein the geo-referenced coverage areas are computed on the basis of at least one of: (i) a database of topology across the geographic region, (ii) a stochastic model of topology across the geographic region, (iii) a deterministic model of topology across the geographical region, (iv) a set of restrictions on wireless device locations within the geographic region, (v) a set of restrictions on observation locations within the geographical region (vi) a set of restrictions on coverage areas within the geographic region, and (vii) a set of restrictions on multidimensional spectrum access within the geographic region.

22. The system of claim 15, wherein the geo-referenced coverage areas are expressed with at least one of: (i) vector geo-data and (ii) raster geo-data.

23. The system of claim 15, wherein the geo-referenced portions of idle multidimensional radio spectrum access represent geo-referenced portions of noncontiguous multidimensional radio spectrum access.

24. The system of claim 15, wherein the sixth module utilizes matrix-oriented representations of multidimensional radio spectrum access.

25. The system of claim 15, wherein the sixth module utilizes at least one of: (i) sparse array representations of multidimensional radio spectrum access and (ii) linked-list representations of multidimensional radio spectrum access.

26. The system of claim 15, further comprising an eighth module operable to display the geo-referenced portions of idle multidimensional radio spectrum access in terms of at least one of: (i) spatial statistics, (ii) aggregate statistics, and (iii) a combination of spatial statistics and aggregate statistics.

27. The system of claim 26, wherein the eighth module comprises a ninth module operable to display the geo-referenced portions of idle multidimensional radio spectrum access in terms of at least spatial statistics and wherein the spatial statistics include a geo-referenced map of the computed portions of the idle multidimensional radio spectrum access across the geographic region.

28. The system of claim 26, wherein the eighth module comprises a ninth module operable to display the geo-referenced portions of idle multidimensional radio spectrum access in terms of at least aggregate statistics and wherein the aggregate statistics include any at least one of (i) a cumulative distribution function (CDF), (ii) a probability density function (PDF), and (iii) a probability mass function (PMF).

29. The system of claim 15, further comprising a local wireless device, the local wireless device having at least one of: (i) a physical layer transmit functionality and (ii) a physical layer receive functionality.

30. The system of claim 29, further comprising an eighth module operable to adjust the physical layer functionality of the local wireless device to operate according to a set of radio spectrum access parameters selected from the computed geo-referenced portions of idle multidimensional radio spectrum access across the geographical region.

31. The method of claim 1, wherein determining comprises:
 determining the geo-referenced locations the wireless devices based on at least one of a stochastic model of positions of the wireless devices or a deterministic model of positions of the wireless devices.

32. The system of claim 15, wherein the determining means comprises:

an eighth module operable to determine the geo-referenced locations the wireless devices based on at least one of a stochastic model of positions of the wireless devices or a deterministic model of positions of the wireless devices.

* * * * *

UNITED STATES PATENT AND TRADEMARK OFFICE
CERTIFICATE OF CORRECTION

| | | |
|---|---|---|
| PATENT NO. | : 8,233,897 B2 | Page 1 of 1 |
| APPLICATION NO. | : 11/453038 | |
| DATED | : July 31, 2012 | |
| INVENTOR(S) | : Jeffrey D. Poston | |

It is certified that error appears in the above-identified patent and that said Letters Patent is hereby corrected as shown below:

Title Page, Item (57), "Abstract" line 7, "go-referenced" should be replaced with --geo-referenced--.

Column 13, Line 23, "based the received" should be replaced with --based on the received--.

Column 15, Line 6, "locations the wireless" should be replaced with --locations of the wireless--.

Signed and Sealed this
Second Day of October, 2012

David J. Kappos
*Director of the United States Patent and Trademark Office*